United States Patent Office 3,651,203
Patented Mar. 21, 1972

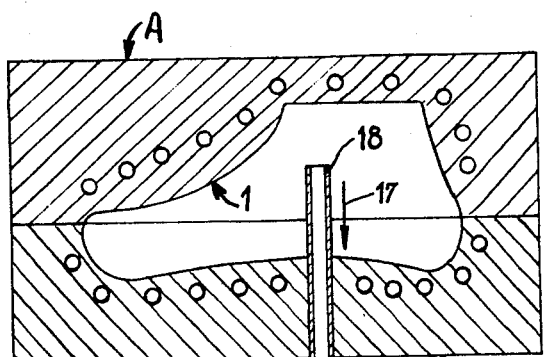
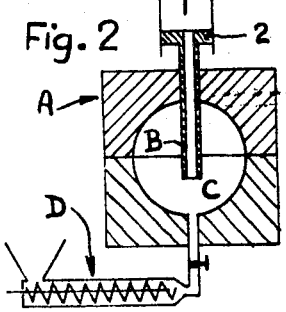
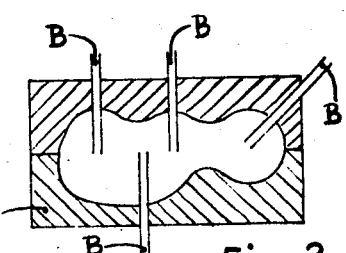
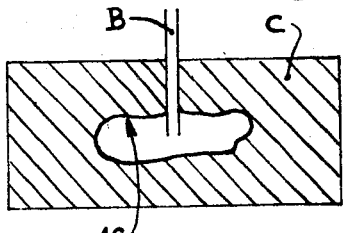
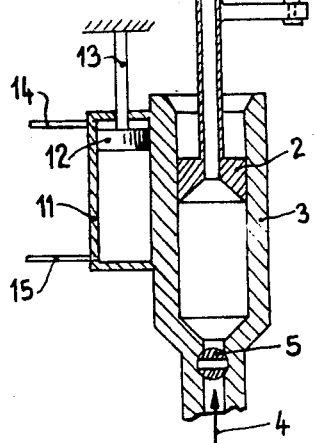
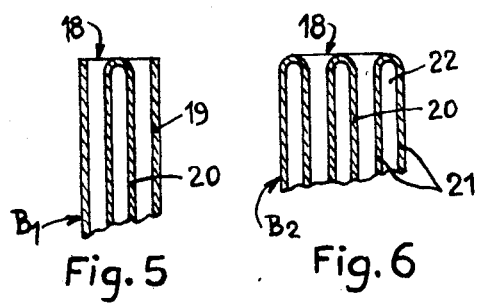

3,651,203
PROCESS FOR THE MANUFACTURE OF SOLID PARTS FROM THERMO-PLASTIC MATERIAL
Henry Massonnet, Nurieux, Ain, France
Original application Jan. 13, 1967, Ser. No. 609,045. Divided and this application May 29, 1969, Ser. No. 851,513
Claims priority, application France, Jan. 15, 1966, 46,823
Int. Cl. B29f 1/06
U.S. Cl. 264—328          4 Claims

ABSTRACT OF THE DISCLOSURE

Large solid objects are moulded from plastic material by injecting the molten material into a mould via a conduit which is progressively withdrawn from the mould during the injection process. The disclosure may be applied directly to a moulding process, or it may be used to repair moulded articles which are defective owing to internal cavities.

---

This is a continuation of application Ser. No. 609,045, filed Jan. 13, 1967 and now abandoned.

The present invention relates to a new process which allows the manufacture from thermo-plastics of parts which are solid or of considerable thickness, as well as of blocks or any bulky parts which may reach several hundred kilograms in weight.

It is known that when the manufacture of such parts is attempted, the shrinkage of the material during cooling causes depressions or holes in the external surface, and serious contractions in the interior which may even go so far as to form cavities. In fact, the feed channel which is usually placed at the surface-level of the part, is sometimes blocked by the solidifying of the material, and cannot then supply the interior of the part with molten material.

The object of the invention is to avoid these disadvantages in order to provide a means of manufacturing thermo-plastic parts which are compact, that is to say without any interior cavity, exterior depression or internal tension.

According to this invention molten or plastics material is injected into a mould through a movable conduit, which is progressively withdrawn from the mould during the injection. The invention can be applied to a moulding process in which bulk molten or plastic material is injected before the withdrawal of the conduit commences, or it may be applied to fill cavities in existing solid state mouldings. In the first case, it is preferred to carry out the withdrawal in timed relationship to the speed of cooling of the injected material.

Preferably the mould is fitted with a cooling system which can act very rapidly, and which is fed for example, by a fluid at a temperature appreciably below 0° C., then, proportionately to the cooling, injection of molten material is continued into the interior of the part, into the zone or zones which are still molten, by means of one or more conduits which are progressively withdrawn from the interior of the part. Since this conduit, or these conduits, are constantly filled with material under pressure it will be seen that when they are completely withdrawn from the part this latter will be homogeneous in its bulk, and notably free from cavities, depressions and internal tensions.

Several methods in accordance with the invention, and apparatus for carrying out those methods, will now be described, by way of examples only, with reference to the accompanying drawings, in which:

FIG. 1 is a sectional view of a machine according to the invention ready for manufacturing a solid shoe-last from thermo-plastic material, FIG. 2 shows a first possible manufacturing variant for a machine according to the invention, FIG. 3 illustrates a mould designed for the injection of a solid part of irregular shape, FIG. 4 is a section of a defective solid part of an existing moulding of known type, it being proposed to fill an internal cavity in it by the process according to the invention, FIGS. 5, 6 and 7 are sectional views showing the tips of several forms of heated or cooled conduits for use in carrying out the invention, which are intended to ensure the filling of the internal cavity of the part during the shrinkage of the plastics material.

In the example shown in FIG. 1, it is proposed to manufacture a solid shoe last from thermo-plastic material. For this purpose a mould A is provided which forms an imprint 1 of appropriate shape. The injection is carried out through a conduit B which projects into the centre of the imprint 1, this conduit being able to slide in, yet form a seal with the mould A.

The end of the conduit B exterior to the mould A carries a piston 2 with a central bore, this piston being able to move within an injection pot 3 into which the plastified material is driven in the direction of the arrow 4, through a control cock 5. The conduit B is also fixed to the stem 6 of a piston 7 which slides in a cylinder 8 fixed to the mould A. The assembly 6, 7, 8 constitutes a double-acting jack into which a fluid under pressure is sent through either of the channels 9 and 10.

The pot 3 is carried by a cylinder 11 which is slidable along a fixed piston 12 of which the stem 13 is fastened to a fixed point on the frame of the machine. The assembly 11, 12, 13 constitutes a double-acting jack fed by fluid under pressure through either of the channels 14 and 15.

The operation is as follows:

At the start, the jacks 6, 7, 8 and 11, 12, 13 are held in the rest position shown in FIG. 1. The cock 5 is opened and plastic is injected into the pot 3 from where it is transferred via the conduit B into the imprint 1 of the mould A.

When this first injection is completed, and the mould is filled, the cock 5 is closed. Hydraulic pressure is applied to the jack 11 by means of the channel 14. This jack moves the pot 3 towards the mould and this compresses the molten thermo-plastic material in the reservoir formed by the pot 3. The interior of the mould which is still in a molten state, is thus supplied with molten plastics under pressure in such a way as to fill the depressions caused by the shrinkage of the plastics during cooling—depressions which without this supply would cause the formation of cavities.

Then a controlled withdrawal of the conduit B is carried out by operation of the jack 8, in the direction of the arrow 17. This withdrawal of the conduit B is carefully timed in relation to the cooling of the interior of the component being moulded so that good fusion is made between the plastics leaving the conduit B and the surrounding material of the part which is in a state close to melting.

The system of temperature regulation with which the conduit B is provided allows this operation to be successfully carried out.

The withdrawal of the conduit B is made right to the exterior of the component, thus making a plug which solidifies by cooling on contact with the mould.

In the example shown in FIG. 2, the two phases of injection which correspond, the first to the forming of the part proper, and the second to the maintaining of that same part under pressure, are carried out separately. For this, the thermo-plastic material is first driven into the mould A by means of a machine D of known type, which may be an extruder or an injection pot. The material at the same time fills the reservoir formed by the pot 3, the conduit B being in the centre of the component, or at least in the zone where the cooling is slowest. The material feed coming from the conveyor is shut off, and the conduit is withdrawn in the same way as has been previously described, the reservoir being provided with a device which maintains the material in it constantly under pressure.

In the example shown in FIG. 3, the impress of the mould A has a fairly complicated shape or is of large dimensions, which would tend to cause several cavities to appear during shrinkage. For this mould there are provided a number of conduits B, four for example, carefully placed to ensure filling in the way already described.

Similarly, the process and the machine according to the invention may be used to fill a cavity or cavities 16 of a solid component C (FIG. 4) manufactured by known methods. Such a cavity may be discovered by X-ray or ultrasonic examination of the defective component. It is sufficient to pierce through the component a hole allowing a conduit B to be introduced in order then to proceed in the manner already described. Finally, it would be equally possible to fill the cavtiy or cavities by means of a process other than that of intrusion or of injection. For example, the filling may be carried out by calcination or by breaking-out, using independent feed conduits B (see, for example the variants shown in FIGS. 2 and 3).

The construction of the conduits B is important. It must be possible to:
  regulate the interior temperature so that the material in the conduit shall be always in a molten state;
  regulate the exterior temperature of the conduit so that the fusion of the molten material which it discharges shall be correctly made with the surrounding plastic material, which is aldready more or less solidified.

In FIGS. 5, 6 and 7, three possible design variants of the tip 18 of a conduit B for use in a process according to the invention are shown. For clarity of explanation, these three variants of the conduit B are distinguished by indices, that is $B_1$ in FIG. 5, $B_2$ in FIG. 6 and $B_3$ in FIG. 7.

The conduit B, comprises a tubular exterior wall 19 inside which is a hollow cylindrical sleeve 20, which is sealed at the end. This sleeve 20 is filled with a heating fluid, or it encloses known means of heating—such as for example, electrical resistances—which allow its temperature to be brought exactly to the desired level.

The conduit $B_2$ (FIG.6) also includes an interior regulator sleeve 20, and its outer circumference is formed by a double walled tube 21. The intermediate space 22 of this latter is used for the circulation of a heating or cooling fluid, or to house electrical resistances. Thus the temperature of the exterior wall of the conduit B and the temperature within the molten material which it discharges may be regulated to different levels.

The conduit $B_3$ shown in FIG. 7 is equipped with an even more developed regulatory system. As in the previous examples, a regulating sleeve 20 is fitted in the centre of the conduit $B_3$. On the other hand, the outside of the conduit $B_3$ is formed by a triple-walled tube, which encloses two independent concentric cavities, that is an interior cavity 23, and an exterior cavity 24. The interior cavity 23 is fitted with suitable known means of heating (circulation of fluid or electrical resistances) capable of ensuring the heating of the plastic material discharged by the conduit $B_3$. On the other hand, the exterior cavity 24 allows the bulk of plastic matetrial outside the conduit $B_3$ to be cooled.

It must moreover be understood that the preceding specific descriptions have been given only by way of examples and that they are not intended to limit the scope of the invention, which will not be avoided by replacing the constructional details described by any other equivalents.

In particular, the invention will not be avoided by inverting the arrangements shown in FIGS. 1 to 4, that is to say by providing movable moulds A which are displaced in relation to fixed conduits B.

I claim:
1. In the method of injection molding thermoplastic material into a mold through a movable conduit extending into a central portion of a cavity within the mold after the mold is filled, the improvement comprising the step of cooling the mold; the step of shutting off the feed line; the step of continuing injecting molten material into the cavity to fill any depression by compressing the molten material in a reservoir connected to the conduit; and thereafter progressively withdrawing said conduit from the mold during said continuing injection step and after the cooling has substantially ended and until the conduit has wholly cleared the cavity.

2. In a process as set forth in claim 1, said cooling extending for such a time that the major portion of the molded article has completely shrunk, while the central portion thereof is still in the plastified state.

3. In the method of injection molding thermo-plastic material into a mold through a movable conduit extending into a central portion of a cavity within the mold after the mold is filled, the improvement comprising the step of cooling the mold; the step of shutting off the feed line; the step of continuing injecting molten material into the cavity to fill any depression by compressing the molten material in a reservoir connected to the conduit with the reservoir wall moving relative to the conduit; and thereafter progressively withdrawing said conduit from the mold during said continuing injection step and after the cooling has substantially ended and until the conduit has wholly cleared the cavity.

4. In a process as set forth in claim 3, said cooling extending for such a time that the major portion of the molded article has completely shrunk, while the central portion thereof is still in the plastified state.

References Cited
UNITED STATES PATENTS

| | | | |
|---|---|---|---|
| 2,757,416 | 8/1956 | Montross | 264—328 X |
| 2,996,764 | 8/1961 | Ross | 264—328 X |
| 3,211,605 | 10/1965 | Spaak | 264—X |
| 3,211,813 | 10/1965 | Behrendt | 264—36 |
| 3,306,960 | 2/1967 | Weissman | 264—51 |
| 3,366,993 | 2/1968 | Lemelson | 18—26 |
| 3,505,137 | 4/1970 | Kliene | 264—36 X |

ROBERT F. WHITE, Primary Examiner

R. R. KUCIA, Assistant Examiner

U.S. Cl. X.R.

18—30